June 26, 1962 W. L. TODD 3,040,772
AUTOMATIC RESET RELIEF VALVE
Filed Dec. 28, 1959 2 Sheets-Sheet 1
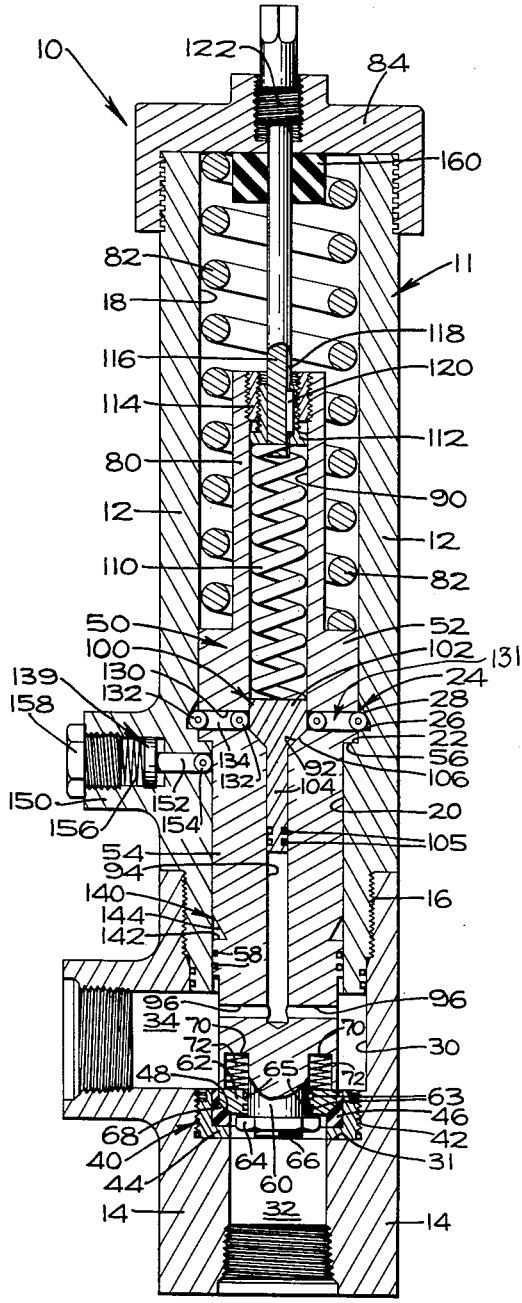
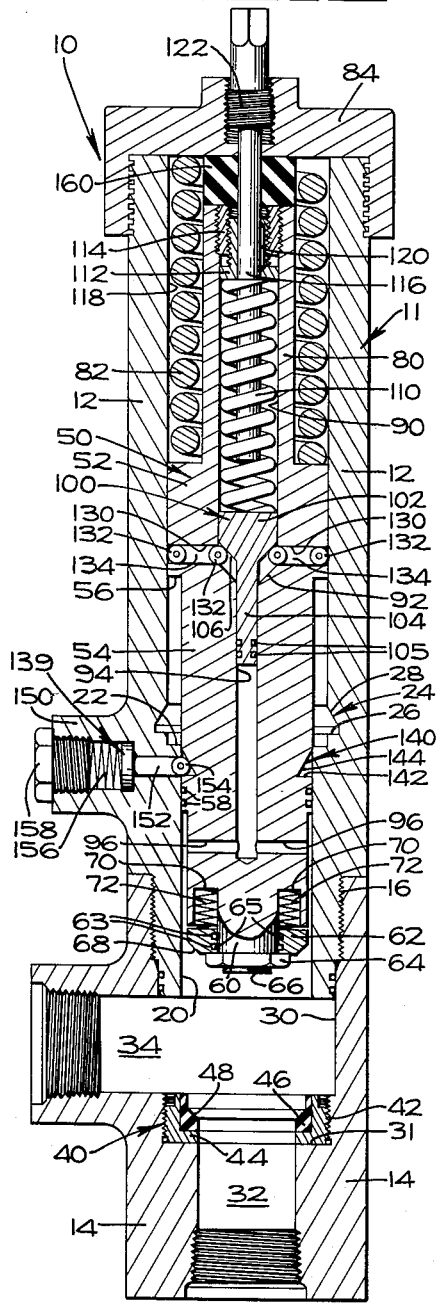
INVENTOR
WILLIAM L. TODD
BY *Hans G. Hoffmeister*
ATTORNEY June 26, 1962 W. L. TODD 3,040,772
AUTOMATIC RESET RELIEF VALVE
Filed Dec. 28, 1959 2 Sheets-Sheet 2
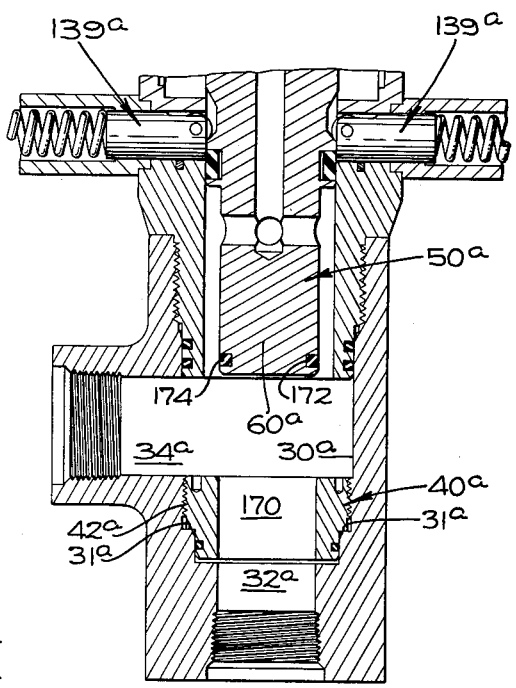
FIG_4
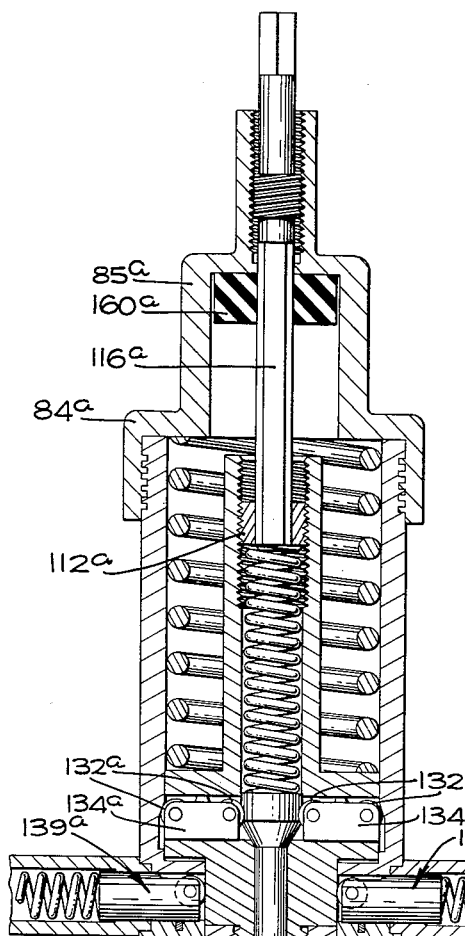
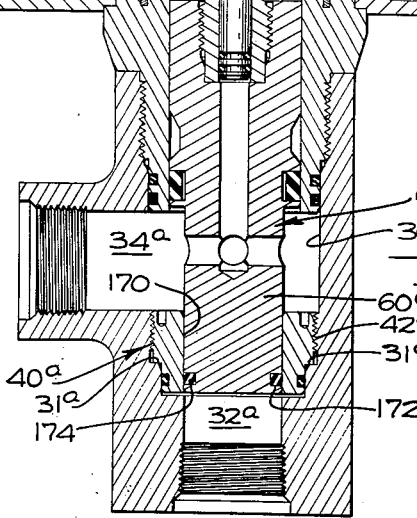
FIG_3
INVENTOR
WILLIAM L. TODD
BY Hans G. Hoffmeister
ATTORNEY

United States Patent Office 3,040,772
Patented June 26, 1962

3,040,772
AUTOMATIC RESET RELIEF VALVE
William L. Todd, Houston, Tex., assignor, by mesne assignments, to FMC Corporation, San Jose, Calif., a corporation of Delaware
Filed Dec. 28, 1959, Ser. No. 862,169
7 Claims. (Cl. 137—509)

This invention pertains to pressure relief valves and more particularly to a pressure relief valve particularly useful for venting excess pressure from the mud line of a well drilling rig.

In drilling a well, drilling mud is circulated within the well to lubricate the drill bit and pipe, to remove the cuttings from the well, and to provide sufficient hydrostatic pressure to prevent a blowout if a high pressure deposit of oil, gas, or other fluid is encountered. The drilling mud is circulated by a large pump, usually of the positive displacement type. A pressure relief valve is incorporated in the mud line on the discharge side of the pump to prevent excessive mud pressures from developing. The pressure relief valves heretofore used were of the type which employed a shear pin adapted to break and permit the valve to open when excessive pressure existed in the mud line. The use of this type of valve required that a new shear pin be installed after each time the valve vented to relieve excess pressure. Also, since the drilling mud is very abrasive in its nature, the life of these vent valves was relatively short due to the erosion of the valve parts caused by the high velocity flow of the drilling mud therethrough.

It is therefore an object of the present invention to provide an improved pressure relief valve.

Another object is to provide a pressure relief valve which automatically resets itself when the excess pressure condition has been relieved.

Another object is to provide a pressure relief valve which may be adjusted to respond to different pressures.

Another object of the invention is to provide a pressure relief valve which has a snap action to quickly move the sensitive valve parts out of the high velocity abrasive flow when the valve opens to minimize the erosion thereof.

Another object of the invention is to provide a pressure relief valve having a snap action and wherein the valve parts are locked in either their open or closed positions to prevent valve chatter.

These and other objects and advantages of the present invention will become apparent from the following detailed description and accompanying drawings in which:

FIG. 1 is a longitudinal section through a valve embodying the principles of the present invention, with the valve shown in closed position.

FIG. 2 is a view similar to FIG. 1, with the valve shown in open position.

FIG. 3 is a longitudinal section through a modified form of the valve of the invention, showing the same in closed position.

FIG. 4 is a fragmentary longitudinal section showing the valve of FIG. 3 in open position.

As shown in FIGS. 1 and 2, the valve 10 comprises a tubular housing 11 having an upper portion 12 and a lower portion 14 connected together by a threaded connection 16. The bore through the upper housing portion 12 has an upper large diameter section 18 and a lower smaller diameter section 20 interconnected by an upwardly facing shoulder 22. An annular groove 24 is formed in the wall of the bore section 18 adjacent and above the shoulder 22. The lower wall 26 of the groove 24 is normal to the axis of the bore section 18 and the upper wall 28 is inclined upwardly and inwardly. The purpose of the groove 24 and of the particular configuration thereof will be described hereinbelow.

The lower housing portion 14 is provided with an axial bore having an upper large diameter section 30 connected by a shoulder 31 to a lower smaller diameter section 32. The lower section 32 serves as the valve outlet. A lateral bore or passageway 34 intersects the bore section 30 and serves as the inlet or high pressure connection of the valve 10.

An annular valve seat assembly 40 is threaded into suitable threads 42 provided in the bore section 30 encircling the upper end of the discharge passageway 32 and beneath the inlet passageway 34, and seats against the annular shoulder 31 between the upper and lower bore sections 30 and 32, respectively. The valve seat assembly 40 comprises a metal ring 44 within which is seated an upwardly facing valve element 46 of resilient material provided at its upper end with an inverted frusto-conical surface 48.

A piston 50 is slidably mounted in the housing portion 12 and comprises a flange portion 52 slidably received within the upper bore section 18 of the housing portion 12, and a lower portion 54 of smaller external diameter slidably received within the lower bore section 20. The flange portion 52 and the lower portion 54 of the piston are interconnected by a downwardly facing shoulder 56 adapted to abut the upwardly facing shoulder 22 in the bore through the housing portion 12 to limit downward movement of the piston. Suitable O-rings 58 are mounted on the lower portion 54 of the piston 50 to seal against the wall of the bore section 20.

The lower end of the piston 50 is provided with a downwardly projecting cylindrical extension 60. An annular valve member 62 is slidably mounted for limited axial movement on the piston extension 60 and is retained thereon by a nut 64 threaded onto suitable threads 66 provided on the end portion of the extension 60.

The inner surface of the annular valve element 62 is provided with annular grooves 63 within which are mounted O-rings 65 adapted to seal against the surface of the cylindrical extension 60 of the valve piston 50. The valve element 62 is provided with a downwardly and inwardly inclined surface 68 adapted to seat against the upwardly facing surface 48 of the above-described valve seat assembly 40 as the piston 50 approaches its lowest position within the housing 11.

The lower end of the piston 50 is provided with a plurality of blind bores 70 circumferentially spaced in a circle concentric with the axis of the piston. A spring 72 is mounted in each of the bores 70 and bears against the upper surface of the valve element 62 to resiliently press said element into tight engagement with the valve seat assembly 40.

The upper end of the piston 50 is provided with an upwardly projecting extension 80 of smaller external diameter than the flange portion 52 of the piston. A compression spring 82 surrounds the extension 80 with its lower end abutting the upper surface of the flange portion 52 of the piston 50 and its upper end abutting the underside of a cap 84 threaded onto the upper end of the housing portion 12. The spring 82 urges the piston 50 downwardly to maintain the valve element 62 in engagement with the valve seat assembly 40.

Since the valve element 62 is carried by the piston 50 and is moved thereby onto and away from the valve seat 40, the term "valve piston" will hereinafter be used in referring to the piston 50.

A relatively large diameter axial bore or passageway 90 extends through the piston extension 80 and the flange portion 52 of the valve piston 50 and is connected by a downwardly and inwardly inclined surface 92 with a smaller diameter axial bore 94 in the lower piston portion 54. The passageway 94 terminates short of the lower end of the piston 50 and is connected to the exterior thereof by a plurality of radial bores 96 to provide communication between the interior of the housing portion 14 and the passageway 94.

A small pilot piston 100 is slidably received within the valve piston 50. The pilot piston 100 has an upper portion 102 slidably received within the bore 90 and a lower portion 104 slidably received within the smaller diameter bore 94. Suitable O-rings 105 are mounted on the lower portion 104 of the pilot piston 100 to seal against the wall of the bore 94. The upper and lower portions 102 and 104 of the pilot piston 100 are connected by a downwardly facing, downwardly and inwardly inclined, cam surface 106.

A spring 110 is mounted within the bore 90 and bears against the upper surface of the pilot piston 100 to normally retain the pilot piston in its lowermost position relative to the valve piston 50. The upper end of the spring 110 bears against the lower surface of a gland nut 112 threaded into a ferrule 114 which in turn is fixed to the upper end of the piston extension 80. A stem 116 extends through the gland nut 112 and is provided with a longitudinal slot 118 interengaging a suitable key 120 carried by the gland nut 112 whereby rotation of the stem will cause the gland nut 112 to be threaded into or out of the ferrule 114 to adjust the compression of the spring 110 for purposes which will be described hereinbelow.

The upper end of the stem 116 projects through a suitable opening in the cap 84. A suitable connection 122 is provided between the cap 84 and the stem 116, whereby the stem may be rotated relatively to the cap. This connection 122 is shown as a threaded connection, whereby the amount of the stem projecting from the cap gives an indication of the amount of compression stored in the spring 110 and can be calibrated to indicate the pressure at which the valve will open in the manner described hereinbelow.

A plurality of radial openings 130 are formed in the flange portion 52 of the valve piston 50 in such position that they are aligned with the previously described annular groove 24 in the housing portion 12 when the valve piston 50 is in its lowermost position. A detent assembly 131 is located in each of the openings 130. Each detent assembly comprises two rollers 132 held in spaced apart relation by a connecting link 134. The link 134 is of such length that either one of the rollers must project outwardly beyond the exterior of the flange 52 or the other roller must project inwardly into the bore 90. When the valve is closed as illustrated in FIG. 1, the pilot piston 100 keeps the detent in its outer position with the outer roller projecting into the annular groove 24 to lock the valve piston 50 in its lowermost position.

A second detent mechanism 139 is provided to lock the valve piston 50 in its upper, or valve open, position and comprises an annular groove 140 formed in the lower portion 54 of the valve piston 50. The groove 140 has a lower wall 142 normal to the axis of the valve piston and an upper wall 144 which slopes upwardly and outwardly. The housing portion 12 is provided with a laterally extending tubular boss 150 within which a rod 152, carrying at its inner end a roller 154, is slidably mounted. A spring 156 abuts the outer end of the rod 152 and is confined by a plug 158 threaded into the boss 150. When the valve piston 50 is raised to its upper, or valve open, position the spring 156 forces the roller 154 inwardly into the groove 140.

While the valve 10 has been described with use of terms such as upwardly and downwardly, these terms are used only with respect to the position in which the valve is illustrated in the drawing. The gravity forces acting on the valve piston 50 are negligible and the valve will function equally well regardless of its orientation.

In the use of the valve 10 of the invention, the inlet passageway or port 34 is connected to the high pressure line to be controlled, as for example the high pressure mud line of a well drilling rig. The valve discharge port or passageway 32 is connected to a suitable discharge point, as for example the mud pit. The valve parts will be in the positions illustrated in FIG. 1 with the valve element 62 seated tightly against the valve seat assembly 40. As the pressure in the line builds up it acts on the valve piston 50, tending to raise the same within the housing 11. However, the valve piston 50 is retained in its lower position by the detent rollers 132 which extend into the grooves 24.

The high pressure also enters through the passageways 96 into the passageway 94 and exerts an upward force against the pilot piston 100. When the pressure in the line becomes high enough to lift the pilot piston 100 against the compressive force of the spring 110, the detent rollers 132 are released and move inwardly. The pressure acting on the valve piston 50 snaps the valve piston upwardly to the position illustrated in FIG. 2 and the detent roller 154 enters the groove 140 to retain the valve piston in this position. The fluid from the line now vents through the discharge port or passageway 32.

When the pressure of the fluid entering the inlet passageway 34 drops to the extent that the pressure augmented by the restraining action of the detent roller 154 is no longer sufficient to overcome the force of the spring 82, the spring snaps the valve piston 50 downwardly until the shoulder 56 thereon strikes the shoulder 22 in the housing. The spring 110 then forces the pilot piston 100 downwardly and the cam surface 106 thereon moves the detent rollers 132 outwardly to again project the outermost ones into the groove 24.

It will be noted that there is a slight overtravel of the valve piston 50 relative to the valve seat assembly 40, and that the valve element 62 which is floatingly mounted on the valve piston is pressed into engagement with the valve seat 40 by the resilient springs 72. This overtravel of the valve piston 50 coupled with the floating action of the valve element 62 automatically compensates for any wear of the seating elements 46 and 62.

It will be further noted that the valve adjusting stem 116 does not rise with the valve piston 50. Instead, the gland nut 112 merely slides along the stem until the upward movement of the valve piston 50 is arrested by contact with a rubber bumper block 160 fixed to the underside of the cap 84.

It should be appreciated that the pressure at which the valve 10 will open is directly proportional to the compressive force of the spring 110 since the line pressure must first move the pilot piston 100 upwardly against this compressive force. Therefore, the valve 10 can be adjusted to open in response to different line pressures by rotation of the stem 116 to move the gland nut 112 upwardly to reduce the compressive force of the spring 110, or downwardly to increase said force.

The working parts of the valve 10, i.e., the valve piston 50 and its associated elements, are located out of the stream of the high velocity abrasive fluid flowing through the valve 10 when it is open, consequently they will not be materially affected thereby. The valve seat assembly 40, which unavoidably is subjected to the abrasive action of the discharge fluid, is easily replaceable without disturbing the valve working parts by unthreading the upper portion 12 of the housing 11 from the lower portion 14. All of the working parts remain assembled in the housing portion 12 and are removed therewith from the housing portion 14 to expose the valve seat assembly 40 which may now be unthreaded from the valve housing portion 14 and replaced. The valve element 62 also is exposed, so that if it requires replacement this element may be replaced by unthreading the nut 64. The valve 10 is then reassembled by threading the housing portion 12 into the portion 14.

Since the working parts of the valve illustrated in FIGS. 3 and 4 are essentially the same as those illustrated in FIGS. 1 and 2, corresponding elements of the modified form of the valve are given the same reference numerals as those used in the description of FIGS. 1 and 2, but with the letter "a" appended thereto. The principal difference between the structure shown in FIGS. 3 and 4, and that shown in FIGS. 1 and 2 is in the sealing elements of the valve.

The valve seat ring 40a is threaded into the threads 42a in the bore section 30a encircling the upper end of the discharge passageway 32a beneath the inlet passageway 34a and seats against the annular shoulder 31a between the upper and lower bore sections 30a and 32a, respectively. The annular valve seat 40a is provided with an internal bore 170. The valve piston 50a is formed with an elongate lower end 60a which is slidably received within the bore 170 of the valve seat ring 40a. An annular groove 172 is formed about the periphery of the lower end of the portion 60a of the valve piston 50a and a suitable sealing element 174 is mounted within the groove 172 to effectively seal against the wall of the bore 170 when the portion 60a of the valve piston is received therewithin.

Certain other differences between the structure of the valve mechanism shown in FIGS. 3 and 4 and that shown in FIGS. 1 and 2 will be noted. This modification uses a hexagonal rod 116a to engage a complementary opening in the gland 112a instead of employing the slot and key connection illustrated in FIGS. 1 and 2. Similarly the cap 84a is provided with an upwardly extending chamber 85a which receives the rubber bumper 160a instead of the flat upper surface cap 84 illustrated in FIGS. 1 and 2. The detent rollers 132a are connected by spaced plates 134a in place of the links 134 illustrated in FIGS. 1 and 2. The modification disclosed in FIG. 3 is provided with multiple detent means 139a for retaining the valve piston 50a in its uppermost position.

The operation of the modification illustrated in FIGS. 3 and 4 of the drawings is the same as that described with relation to the modification illustrated and described with respect to FIGS. 1 and 2.

While two embodiments of the present invention have been shown and described herein, various changes may be made therein without departing from the spirit of the invention as defined in the appended claims.

The invention having been thus described, what is claimed and desired to be secured by Letters Patent is:

1. A pressure relief valve comprising a tubular housing, an annular valve seat within said housing, said housing have a discharge passageway and an inlet passageway opening outwardly from said housing on opposite sides of said valve seat, a tubular valve piston slidably mounted in the housing and adapted to seat against said valve seat and thereby control flow between the passageways, first spring means urging said valve piston toward the valve seat, detent means for locking the valve piston against movement away from the valve seat, a pilot piston slidably received in said valve piston, second spring means applying pressure to said pilot piston resisting movement thereof and yieldably urging said pilot piston against said detent means to lock said valve piston against movement away from said seat, and means engaging said second spring means for adjusting the compression thereof, said valve piston including means for conducting fluid pressure from the inlet passageway to said pilot piston to act thereon in opposition to the pressure of the second spring means to effect release of the detent means when the fluid pressure at said inlet passageway is sufficient to overcome the spring pressure on said pilot piston, said valve piston being moved away from said valve seat upon release of the detent means and against the action of said first spring means to release fluid from the inlet passageway, said second spring means being effective to return said valve piston to the valve seat when the pressure of fluid within the inlet passageway falls below a predetermined value.

2. A pressure relief valve comprising a tubular housing, an annular valve seat fixed within said housing, said housing having a discharge passageway and an inlet passageway opening outwardly from the housing on opposite sides of said tubular valve seat, a valve piston slidably mounted in said tubular housing, a valve element slidably mounted on said valve piston for limited movement longitudinally thereof and adapted to seat against said annular valve seat, means resiliently urging the valve element toward said valve seat, first spring means urging the valve piston toward the valve seat, detent means for releasably locking the valve piston against movement away from the valve seat, a pilot piston slidably received in said valve piston, second spring means applying pressure to the pilot piston resisting movement thereof and yieldably urging said pilot piston against said detent means to lock said valve piston against movement away from said seat, means engaging said second spring means for adjusting the compression thereof, said valve piston including means for conducting fluid pressure from the inlet passage to said pilot piston to act thereon in opposition to the pressure of the second spring means, whereby when the fluid pressure at said inlet passageway overcomes the spring pressure on the pilot piston the detent will be released and said pressure will move the valve piston and the valve element away from the valve seat against the action of said first spring means to permit fluid to vent through the pressure relief valve, said first spring means being effective to return the valve piston when the pressure of fluid within the inlet passageway falls below a predetermined value, said valve element contacting the annular valve seat before the valve piston completes its return movement.

3. In a valve, a housing having a bore, an outlet in axial communication with said bore, and an inlet in lateral communication with said bore; a valve piston slidably received in said bore for movement toward and away from said outlet between valve closing and opening positions, said inlet and outlet being in liquid communication in said valve opening position, said valve piston providing a passageway opening outwardly of said valve piston and communicating with said inlet; means engaging said valve piston for yieldably urging it into its closing position; detent means borne by said valve piston for movement between a position engaging said housing and precluding movement of said valve piston out of its closing position and a retracted position projecting into said passageway and permitting opening movement of said valve piston; a pilot piston slidably received in said passageway for movement between a detent holding position in the path of movement of said detent means to preclude retraction thereof and a detent releasing position displaced in said passageway from said path thereby permitting said retraction; and means engaging said pilot piston for yieldably maintaining it in said holding position.

4. In a valve, a housing having a bore, an outlet in axial communication with said bore, and an inlet in lateral communication with said bore, a valve piston slidably received in said bore for movement toward and away from said outlet between valve closing and opening positions, said inlet and outlet being in liquid communication in said valve opening position, said valve piston providing a passageway opening outwardly of said valve piston and communicating with said inlet; means engaging said valve piston for yieldably urging it into its closing position; detent means borne by said valve piston for movement between a position engaging said housing and precluding movement of said valve piston out of its closing position and a retracted position permitting opening movement of said valve piston; a pilot piston slidably received in said passageway for movement between a detent holding position in the path of movement of said detent means to preclude retraction thereof and a detent releasing position displaced in said passageway from said path thereby permitting said retraction, said pilot piston having opposite ends one of which faces the opening in said passageway; a spring in said passageway bearing against the opposite end of the pilot piston from the end facing the opening in said passageway; and spring adjusting means axially adjustably fitted in said housing and extending into said passageway into engagement with said spring for enabling adjustment of the compression of said spring.

5. In a valve, a housing having opposite first and second ends and a bore extending between said ends, an outlet communicating and in axial alignment with the bore at said first end, and an inlet communicating with the bore between said ends; a valve piston slidably received in said bore for reciprocation between a valve closing position in liquid sealing relation to said outlet and a valve opening position retracted from said closing position, said valve piston providing a passageway having a first end opening laterally of said valve piston and communicating with said inlet and an opposite second end adjacent to said second end of said housing; a spring in said bore yieldably urging said valve piston into its closing position; detent means mounted in said valve piston for movement radially thereof between an outer locking position engaging said housing and precluding movement of said valve piston out of a valve closing position and an inner unlocked position moved inwardly of said valve piston from said locking position; a pilot piston slidably received in said passageway for reciprocation between a detent holding position in the path of movement of said detent means to preclude said inward movement thereof and a detent releasing position out of said path of movement thereby permitting said inward movement; and a spring in said passageway, bearing against said pilot piston, and yieldably maintaining it in said holding position so that fluid pressure from said inlet entering said passageway moves said pilot piston into its releasing position whereby said valve piston is free to be moved into opening position by said pressure.

6. In a valve, a housing having opposite first and second ends and a bore extending between said ends, an outlet communicating and in axial alignment with the bore at said first end, and an inlet communicating with the bore between said ends; a valve piston slidably received in said bore for reciprocation between a valve closing position in liquid sealing relation to said outlet and a valve opening position retracted from said closing position, said valve piston providing a passageway having a first end opening laterally of said valve piston and communicating with said inlet and an opposite second end adjacent to said second end of said housing; a spring in said bore yieldably urging said valve piston into its closing position; detent means mounted in said valve piston for movement radially thereof between an outer locking position engaging said housing and precluding movement of said valve piston out of a valve closing position and an inner unlocked position moved inwardly of said valve piston from said locking position; a pilot piston slidably received in said passageway for reciprocation between a detent holding position in the path of movement of said detent means to preclude said inward movement thereof and a detent releasing position out of said path of movement thereby permitting said inward movement; a cap connected to said second end of said housing; spring adjusting means in said passageway in longitudinally spaced relation to said pilot piston and adjustably received in said cap for movement toward and away from said pilot piston; and a spring in said passageway between said pilot piston and said adjusting means and yieldably maintaining said pilot piston in said holding position so that fluid pressure from said inlet entering said passageway moves said pilot piston into its releasing position upon overcoming the force of said spring in said passageway whereby said valve piston is free to be moved into opening position by said pressure.

7. In a valve, a housing providing a bore and an inlet and an outlet communicating with said bore; a valve piston slidably received in said bore for reciprocation between a valve closing position over said outlet and a valve opening position permitting communication between said inlet and said outlet, said valve piston providing a passageway opening into said bore and communicating with said inlet through said bore; means yieldably urging said valve piston into its closing position; detent means mounted in said valve piston for movement into and out of said passageway between an unlocked position and a locked position respectively permitting and precluding movement of said valve piston away from its closing position; a pilot piston slidably received in said passageway for movement between a detent holding position engageable with said detent means and precluding movement thereof into said passageway and a detent releasing position displaced longitudinally in said passageway from said holding position and permitting movement of said detent means into said passageway; and means in said passageway bearing against said pilot piston and yieldably maintaining it in said holding position.

References Cited in the file of this patent
UNITED STATES PATENTS

| | | |
|---|---|---|
| 1,034,882 | Crane | Aug. 6, 1912 |
| 2,030,143 | Giger-Knusli | Feb. 11, 1936 |
| 2,471,605 | Broeze | May 31, 1949 |
| 2,477,247 | Haberland | July 26, 1949 |
| 2,891,570 | Krupp | June 23, 1959 |
| 2,925,092 | Payne | Feb. 16, 1960 |

FOREIGN PATENTS

| | | |
|---|---|---|
| 526,625 | Italy | Mar. 18, 1955 |